(12) United States Patent
Fukuda et al.

(10) Patent No.: US 8,404,607 B2
(45) Date of Patent: Mar. 26, 2013

(54) DIELECTRIC CERAMIC AND LAMINATED CERAMIC CAPACITOR

(75) Inventors: Megumi Fukuda, Nagaokakyo (JP); Takayuki Yao, Nagaokakyo (JP); Makoto Matsuda, Nagaokakyo (JP); Taisuke Kanzaki, Nagaokakyo (JP)

(73) Assignee: Murata Manufacturing Co., Ltd., Nagaokakyo-Shi, Kyoto-fu (JP)

( * ) Notice: Subject to any disclaimer, the term of this patent is extended or adjusted under 35 U.S.C. 154(b) by 47 days.

(21) Appl. No.: 13/038,541

(22) Filed: Mar. 2, 2011

(65) Prior Publication Data

US 2011/0216471 A1 Sep. 8, 2011

(30) Foreign Application Priority Data

Mar. 3, 2010 (JP) ................................. 2010-046121

(51) Int. Cl.
*C04B 35/468* (2006.01)

(52) U.S. Cl. ...................... 501/138; 501/139; 361/321.4

(58) Field of Classification Search .................. 501/138, 501/139; 361/321.4
See application file for complete search history.

(56) References Cited

U.S. PATENT DOCUMENTS

| | | | |
|---|---|---|---|
| 7,176,156 B2 * | 2/2007 | Umeda et al. .................. | 501/138 |
| 7,381,672 B2 | 6/2008 | Hiramatsu et al. | |
| 7,968,486 B2 * | 6/2011 | Yamaguchi .................... | 501/139 |
| 8,009,408 B2 * | 8/2011 | Matsuda et al. ............ | 361/321.4 |
| 2005/0107241 A1 | 5/2005 | Umeda et al. | |
| 2007/0025060 A1 * | 2/2007 | Kim et al. .................. | 361/321.4 |
| 2007/0135294 A1 | 6/2007 | Hiramatsu et al. | |
| 2008/0013250 A1 | 1/2008 | Aoki | |
| 2008/0310074 A1 | 12/2008 | Togashi et al. | |
| 2009/0128988 A1 * | 5/2009 | Sohn et al. .................. | 361/321.4 |
| 2009/0135546 A1 * | 5/2009 | Wang et al. .................. | 361/321.2 |
| 2009/0284899 A1 | 11/2009 | Yamaguchi | |

FOREIGN PATENT DOCUMENTS

| | | |
|---|---|---|
| CN | 101236838 A | 8/2008 |
| JP | 10-2007-0118556 A | 12/2007 |
| JP | 2008297133 | * 12/2008 |
| JP | 2009012990 | * 1/2009 |
| JP | 2009-177171 A | 8/2009 |
| JP | 2010-040798 A | 2/2010 |
| JP | 2011-029583 A | 2/2011 |
| WO | WO-2008/093684 A1 | 8/2008 |
| WO | WO-2010/013414 A1 | 2/2010 |

OTHER PUBLICATIONS

Korean Intellectual Property Office, Notice of Preliminary Rejection issued for Application No. 10-2011-0015907, dated Mar. 20, 2012.
Japanese Office Action issued for corresponding application JP 2010-046121, dated Jul. 3, 2012 (with English translation).

* cited by examiner

Primary Examiner — Karl Group
(74) Attorney, Agent, or Firm — Dickstein Shapiro LLP

(57) ABSTRACT

A laminated ceramic capacitor which provides favorable life characteristics, even when a high electric field strength is applied while dielectric ceramic layers are reduced in layer thickness to less than 1 μm, contains a dielectric ceramic a compound represented by: $(Ba_{1-x/100}Ca_{x/100})_m TiO_3$ ($0 \leq x \leq 20$) as its main constituent, and as its accessory constituent, aMg-bSi-cMn-dR (R is at least one of La, Ce, Pr, Nd, Sm, Eu, Gd, Tb, Dy, Ho, Er, Tm, Yb, Lu, and Y, and a, b, c, and d (part by mol) respectively satisfy the conditions of $0.1 < a \leq 20.0$, $0.5 < b \leq 20.0$, $0.1 < c \leq 10.0$, and $1.0 < d \leq 30.0$ with respect to 100 parts by mol of the main constituent). The average grain size is 20 nm or more and less than 100 nm for crystal grains in a sintered body obtained by firing the dielectric ceramic.

16 Claims, 1 Drawing Sheet

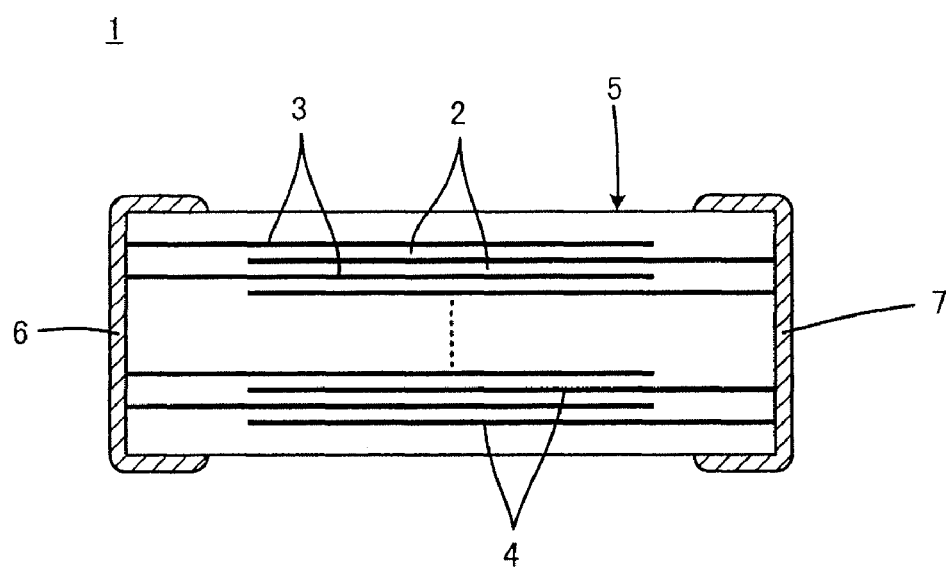

DIELECTRIC CERAMIC AND LAMINATED CERAMIC CAPACITOR

BACKGROUND OF THE INVENTION

1. Field of the Invention

The present invention relates to a dielectric ceramic and a laminated ceramic capacitor, and more particularly, relates to a dielectric ceramic which is suitable for use in a thin-layer high-capacitance type laminated ceramic capacitor, and a laminated ceramic capacitor configured with the use of the dielectric ceramic.

2. Description of the Related Art

As one of effective means for fulfilling the demands of reduction in size and increase in capacitance for laminated ceramic capacitors, there is the reduction of an attempt to reduce the thickness of dielectric ceramic layers provided in the laminated ceramic capacitors.

Therefore, the reduction down to, for example, less than 1 μm has been recently required as the thickness of the dielectric ceramic layer. However, as the dielectric ceramic layers are further reduced in thickness, the electric field applied per dielectric ceramic layer is relatively increased. Therefore, an improvement in reliability in the case of applying a voltage, more specifically, an improvement in life characteristics particularly in a high temperature load test, is required for the dielectric ceramic employed.

In order to improve the reliability as described above, it has become known that it is effective to increase the grain boundary area by increasing the number of crystal grain boundaries in the dielectric ceramic. In order to increase the grain boundary area, it is necessary to reduce the grain size of the crystal grains.

A dielectric ceramic of interest to the present invention is described in, for example, Japanese Unexamined Patent Publication No. 2005-145791.

Japanese Unexamined Patent Publication No. 2005-145791 discloses a dielectric ceramic composition manufactured in accordance with a manufacturing method including a step of firing a main constituent raw material and an accessory constituent raw material. More specifically, disclosed is a dielectric ceramic composition manufactured in accordance with a manufacturing method that uses, as a main constituent raw material before firing, a barium titanate raw material powder of perovskite-type crystal structure represented by $ABO_3$, in which the ratio A/B of an A site constituent to a B site constituent is $1.006 \leq A/B \leq 1.035$ in terms of molar ratio, with a specific surface area of 8 $m^2/g$ to 50 $m^2/g$.

According to Japanese Unexamined Patent Publication No. 2005-145791, the dielectric ceramic composition described above is intended for use as dielectric ceramic layers of laminated ceramic capacitors, which is supposed to be composed of fine grains, and to have high reliability, favorable temperature characteristics, and thus excellent high temperature load life characteristics even when the capacitor is reduced in layer thickness.

However, the example described in Japanese Unexamined Patent Publication No. 2005-145791 only discloses the thickness of the dielectric ceramic layer in the range of 2.3 μm to 2.6 μm, as shown in Tables 1 and 3 thereof. Further, Tables 1 to 3 disclose numerical values in the range of 0.141 μm to 0.284 μm as the average grain sizes for crystal grains in a sintered body of the dielectric ceramic.

Japanese Unexamined Patent Publication No. 2005-145791 thus fails to disclose any cases in which the dielectric ceramic layer has a thickness of less than 1 μm. Therefore, it is not clear that the dielectric ceramic described in Japanese Unexamined Patent Publication No. 2005-145791 still has high reliability, favorable temperature characteristics and thus excellent high temperature load life characteristics as described above, even when the dielectric ceramic layer has a thickness of less than 1 μm. Rather, it is presumed that the reliability, particularly, the high temperature load life characteristics will be likely to be degraded when the dielectric ceramic layer is reduced in thickness to less than 1 μm.

SUMMARY OF THE INVENTION

Therefore, an object of the present invention is to provide a dielectric ceramic which is able to achieve high reliability even with further reduction in layer thickness of a dielectric ceramic layer, and a laminated ceramic capacitor configured with the use of the dielectric ceramic.

The present invention provides a dielectric ceramic containing, as its main constituent, a compound represented by the general formula: $(Ba_{1-x/100}Ca_{x/100})TiO_3$ (wherein $0 \leq x \leq 20$), and contains, as its accessory constituent, aMg-bSi-cMn-dR (wherein R is at least one of La, Ce, Pr, Nd, Sm, Eu, Gd, Tb, Dy, Ho, Er, Tm, Yb, Lu, and Y, and a, b, c, and d (part by mol) respectively satisfy the conditions of $0.1 < a \leq 20.0$, $0.5 < b \leq 20.0$, $0.1 < c \leq 10.0$, and $1.0 < d \leq 30.0$ with respect to 100 parts by mol of the main constituent), and having an average grain size of 20 nm or more and less than 100 nm for crystal grains in a sintered body obtained by firing the dielectric ceramic.

The present invention is also directed to a laminated ceramic capacitor including: a capacitor main body having a plurality of stacked dielectric ceramic layers, and a plurality of internal electrodes formed along the specific interfaces between the dielectric ceramic layers; and a plurality of external electrodes formed in different positions from each other on an outer surface of the capacitor main body and electrically connected to specific ones of the internal electrodes.

In the laminated ceramic capacitor according to the present invention, the dielectric ceramic layer characteristically has a thickness of less than 1 μm and is composed of a sintered body of the dielectric ceramic according to the present invention.

The dielectric ceramic according to the present invention has the composition described above, and has an average grain size selected as described above for crystal grains in a sintered body of the dielectric ceramic, thereby forming highly insulating grain boundaries, and allowing the grain boundaries with a certain area to be dispersed uniformly in the sintered body.

Therefore, when a laminated ceramic capacitor is configured with the use of the dielectric ceramic according to the present invention, a laminated ceramic capacitor can be obtained which is excellent in reliability, particularly, life characteristics, even when the dielectric ceramic layer is reduced in layer thickness to less than 1 μm.

The present invention has enormous significance in that it has been found that the effect of improvement in life characteristics as described above is produced significantly, in particular, when the average grain size falls below 100 nm for crystal grains of the dielectric ceramic which has the composition as described above.

BRIEF DESCRIPTION OF THE DRAWINGS

The sole FIGURE is a cross-sectional view schematically illustrating a laminated ceramic capacitor 1 configured with the use of a dielectric ceramic according to the present invention.

DETAILED DESCRIPTION OF THE INVENTION

With reference to the FIGURE, a laminated ceramic capacitor 1 will be described first to which a dielectric ceramic according to the present invention is applied.

The laminated ceramic capacitor 1 includes a capacitor main body 5 configured with the use of a plurality of dielectric ceramic layers 2 stacked and a plurality of internal electrodes 3 and 4 formed along the specific interfaces between the dielectric ceramic layers 2. The internal electrodes 3 and 4 contain, for example, Ni as their main constituent.

First and second external electrodes 6 and 7 are formed in different positions from each other on the outer surface of the capacitor main body 5. The external electrodes 6 and 7 contain, for example, ag or cu as their main constituent. In the case of the laminated ceramic capacitor 1 shown in the FIGURE, the first and second external electrodes 6 and 7 are formed on respective end surfaces of the capacitor main body 5 opposed to each other. The internal electrodes 3 and 4 include a plurality of first internal electrodes 3 electrically connected to the first external electrode 6 and a plurality of second internal electrodes 4 electrically connected to the second external electrode 7, and these first and second internal electrodes 3 and 4 are arranged alternately in the stacking direction.

It is to be noted that the laminated ceramic capacitor 1 may be a two-terminal capacitor including two external electrodes 6 and 7, or may be a multi-terminal capacitor including a large number of external electrodes.

In this laminated ceramic capacitor 1, the dielectric ceramic layers 2 located between the internal electrodes 3 and 4 opposed to each other are made to have a thickness of less than 1 μm.

In addition, the dielectric ceramic layers 2 are configured with the use of a sintered body of a dielectric ceramic containing, as its main constituent, a compound represented by the general formula: $(Ba_{1-x/100}Ca_{x/100})TiO_3$ (wherein $0 \leq x \leq 20$), and containing, as its accessory constituent, aMg-bSi-cMn-dR (wherein R is at least one of La, Ce, Pr, Nd, Sm, Eu, Gd, Tb, Dy, Ho, Er, Tm, Yb, Lu, and Y, and a, b, c, and d (part by mol) respectively satisfy the conditions of $0.1 < a \leq 20.0$, $0.5 < b \leq 20.0$, $0.1 < c \leq 10.0$, and $1.0 \leq d \leq 30.0$ with respect to 100 parts by mol of the main constituent). Furthermore, the average grain size is controlled to 20 nm or more and less than 100 nm for crystal grains in a sintered body of the dielectric ceramic.

It is to be noted that the (Ba, Ca)/Ti ratio m is set appropriately, and preferably selected in the range of 0.99 to 1.04.

For the production of a raw material for the dielectric ceramic, a $(Ba_{1-x/100}Ca_{x/100})_mTiO_3$ powder as a main constituent is first produced. Therefore, a solid phase synthesis method is applied in which compound powders such as oxides, carbonates, chlorides, and metal organic compounds containing each of constituent elements Ba, Ca, and Ti for the main constituent are mixed at a predetermined ratio, and subjected to calcination. It is to be noted that a hydrothermal synthesis method, a hydrolysis method, etc. may be applied instead of the solid phase synthesis method mentioned above. The main constituent powder has fine grains with an average grain size on the order of 10 nm.

On the other hand, compound powders are prepared as accessory constituents, such as oxides, carbonates, chlorides, and organic metal compounds containing each of R, Si, Mn, and R (wherein R is at least one of La, Ce, Pr, Nd, Sm, Eu, Gd, Tb, Dy, Ho, Er, Tm, Yb, Lu, and Y). Then, these accessory constituent powders are mixed with the main constituent powder described above at a predetermined ratio to provide a raw material powder for the dielectric ceramic.

For the purpose of producing the laminated ceramic capacitor 1, the raw material powder for the dielectric ceramic, which is obtained in the way described above, is used to produce a ceramic slurry, ceramic green sheets are formed from this ceramic slurry, the multiple ceramic green sheets are stacked to obtain a raw laminate to serve as the capacitor main body 5, and firing of this raw laminate is carried out. In the step of firing the raw laminate, the raw material powder for the dielectric ceramic, which is combined as described above, is fired to provide the dielectric ceramic layers 2 composed of the sintered dielectric ceramic.

Experimental examples will be described below, which were carried out in accordance with the present invention.

Experimental Example 1

(A) Production of Dielectric Ceramic Raw Material

The respective powders of fine grains $BaCO_3$, $CaCO_3$, and $TiO_2$ were prepared as starting materials.

Next, these powders were weighed to provide a composition of $(Ba_{1-x/100}Ca_{x/100})_{1.01}TiO_3$ as a main constituent, and then mixed in a ball mill. In this case, the Ca content x was adjusted as shown in the column "Ca content x" in Table 1.

Next, the mixed powders were subjected to calcination synthesis to obtain a $(Ba_{1-x/100}Ca_{x/100})_{1.01}TiO_3$ main constituent powder. The obtained main constituent powder had an average grain size on the order of 10 nm. In addition, according to XRD, unreacted powder in the main constituent powder was below the detection level. More specifically, it has been confirmed that the main constituent powder is a powder with a high degree of synthesis, in spite of its very fine grains.

On the other hand, respective powders of MgO, $MnCO_3$, $SiO_2$, and $Re_2O_3$ were prepared as accessory constituents. It is to be noted that respective powders of $La_2O_3$, $Ce_2O_3$, $Pr_2O_3$, $Nd_2O_3$, $Sm_2O_3$, $Eu_2O_3$, $Gd_2O_3$, $Dy_2O_3$, $Ho_2O_3$, $Er_2O_3$, $Tm_2O_3$, $Yb_2O_3$, $Lu_2O_3$, and $Y_2O_3$ were prepared for the $Re_2O_3$ powder.

Next, the $R_2O_3$ powder was selected as shown in the column "Details of R Constituent" of Table 1, while the respective powders MgO, $MnCO_3$, $SiO_2$, and $R_2O_3$ as the accessory constituents were combined at the molar ratio shown in the columns "Mg Content a", "Si Content b", "Mn Content c", and "R Content d" of Table 1 with respect to 100 parts by mol of the main constituent, and mixed for 10 hours with the use of water as a medium. Evaporative drying was then carried out to obtain a dielectric ceramic raw material powder.

TABLE 1

| Sample Number | Main Constituent Grain | Ca Content x | Mg Content a | Si Content b | Mn Content c | R Content d | Details of R content |
|---|---|---|---|---|---|---|---|
| 1 | BaTiO$_3$ | 0 | 20.0 | 20.0 | 9.7 | 29.0 | 4.0Dy—25.0Yb |
| 2 | (Ba, Ca) TiO$_3$ | 2 | 17.8 | 6.9 | 10.0 | 18.0 | 18Tb |
| 3 | (Ba, Ca) TiO$_3$ | 6 | 12.5 | 7.9 | 7.5 | 8.0 | 4.0Sm—4.0Eu |
| 4 | (Ba, Ca) TiO$_3$ | 10 | 11.8 | 7.2 | 6.3 | 9.3 | 3.1Nd—6.2Tm |
| 5 | (Ba, Ca) TiO$_3$ | 20 | 16.2 | 6.5 | 6.2 | 6.5 | 2.5Ce—4.0Lu |
| *6 | (Ba, Ca) TiO$_3$ | 22 | 9.7 | 3.9 | 5.1 | 8.0 | 0.5Pr—7.5Er |
| 7 | BaTiO$_3$ | 0 | 15.0 | 4.6 | 5.8 | 16.0 | 6.0Gd—10Ho |
| 8 | (Ba, Ca) TiO$_3$ | 5 | 7.8 | 3.0 | 4.7 | 10.0 | 8.0Y—2.0Gd |
| 9 | (Ba, Ca) TiO$_3$ | 10 | 10.8 | 6.1 | 3.2 | 9.5 | 9.5Dy |
| 10 | (Ba, Ca) TiO$_3$ | 5 | 0.2 | 2.5 | 2.8 | 8.0 | 8.0La |
| 11 | (Ba, Ca) TiO$_3$ | 8 | 8.2 | 5.8 | 4.1 | 7.7 | 4.0Dy—3.7Y |
| 12 | (Ba, Ca) TiO$_3$ | 12 | 6.2 | 0.6 | 0.5 | 4.0 | 4.0Y |
| 13 | BaTiO$_3$ | 0 | 18.2 | 4.9 | 0.2 | 5.2 | 5.2Tb |
| 14 | (Ba, Ca) TiO$_3$ | 5 | 1.9 | 3.8 | 1.5 | 1.2 | 1.2Yb |
| *15 | (Ba, Ca) TiO$_3$ | 12 | 4.0 | 1.3 | 0.2 | 4.0 | 4.0Gd |
| *16 | BaTiO$_3$ | 5 | 2.8 | 0.6 | 1.0 | 3.2 | 3.0Gd—0.2Ce |
| *17 | (Ba, Ca) TiO$_3$ | 10 | 0.3 | 0.6 | 1.9 | 1.6 | 0.5La—1.1Nd |
| *18 | (Ba, Ca) TiO$_3$ | 10 | 21.0 | 1.3 | 0.5 | 8.0 | 8.0Y |
| *19 | BaTiO$_3$ | 0 | 0.1 | 1.5 | 0.8 | 8.0 | 8.0Y |
| *20 | (Ba, Ca) TiO$_3$ | 8 | 1.8 | 20.2 | 1.0 | 8.0 | 8.0Y |
| *21 | (Ba, Ca) TiO$_3$ | 8 | 2.0 | 0.4 | 0.6 | 8.0 | 8.0Y |
| *22 | (Ba, Ca) TiO$_3$ | 10 | 5.5 | 2.0 | 10.2 | 8.0 | 8.0Y |
| *23 | (Ba, Ca) TiO$_3$ | 9 | 1.5 | 2.0 | 0.1 | 8.0 | 8.0Y |
| *24 | BaTiO$_3$ | 0 | 10.2 | 1.8 | 2.0 | 30.3 | 10.3Yb—20Ho |
| *25 | (Ba, Ca) TiO$_3$ | 10 | 18.1 | 1.9 | 3.8 | 0.9 | 0.9Y |

(B) Production of Laminated Ceramic Capacitor

The ceramic raw material powder with a polyvinyl butyral based binder and ethanol added, was subjected to wet mixing in a ball mill for 24 hours, and then to filtering to eliminate powder with grain sizes outside a predetermined range and produce a ceramic slurry.

Next, the ceramic slurry was formed into the shape of a sheet in accordance with the RIP method to obtain ceramic green sheets. The ceramic green sheets were formed to have a thickness as shown in the column "Ceramic Layer Thickness" in Table 2 after firing, as will be described later.

Next, a conductive paste containing Ni as a main constituent was applied by screen printing onto the ceramic green sheets, thereby forming conductive paste films to serve as internal electrodes.

Next, multiple ceramic green sheets with the conductive paste films formed were stacked so that the sides to which the conductive paste films were drawn were alternated, thereby providing a raw laminate to serve as a capacitor main body.

Next, the raw laminate was heated to a temperature of 300° C. in an N$_2$ atmosphere to burn off the binder, and then after rising the temperature at a rate of 50° C./min, fired at a temperature of 1200° C. for 5 hours in a reducing atmosphere composed of a H$_2$—N$_2$—H$_2$O gas with an oxygen partial pressure of $10^{-10}$ MPa to obtain a sintered capacitor main body.

Next, a Cu paste containing a B$_2$O$_3$—Li$_2$O—SiO$_2$—BaO based glass frit was applied to both end surfaces of the fired capacitor main body, and baked at a temperature of 800° C. in N$_2$ atmosphere to form external electrodes electrically connected to the internal electrodes, thereby providing laminated ceramic capacitors as samples.

The laminated ceramic capacitors thus obtained had outer dimensions of 0.9 mm in length, 1.8 mm in width and 1.0 mm in thickness, the number of effective dielectric ceramic layers was 100, and the area of the internal electrode opposed per ceramic layer was 1.8 mm$^2$. The dielectric ceramic layers interposed between the internal electrodes had the thickness shown in the column "Ceramic Layer Thickness" in Table 2.

(C) Structural Analysis and Characterization of Ceramic Average Grain Size

The laminated ceramic capacitors according to each sample were fractured, and subjected to thermal etching at a temperature of 1000° C., and the fracture surfaces were observed with a scanning microscope. Then, crystal grains appearing in the observed images obtained were subjected to image analysis to measure the grain sizes of the crystal grains, assuming that the equivalent circle diameters of the crystal grains were regarded as the grain sizes. In this case, for each sample, the grain sizes of 300 crystal grains were measured to obtain the average value for the grain sizes.

High Temperature Load Life Test

A high temperature load life test was carried out in which direct-current voltages were applied to the laminated ceramic capacitors of each sample at a temperature of 105° C. so as to provide respective electric field strengths of 6.3 kV/mm and 12.6 kV/mm. In this case, 100 samples for each sample were subjected to the high temperature load life test, and samples with their insulation resistance values decreased to 100 kΩ or less before a lapse of 1000 hours were determined as defectives to obtain the number of defectives among the 100 samples.

The results are shown in Table 2.

TABLE 2

| Sample Number | Ceramic Layer Thickness [μm] | Average Grain Size [nm] | The Number of Defectives in High Temperature Load Life Test | |
|---|---|---|---|---|
| | | | 6.3 kV/mm | 12.6 kV/mm |
| 1 | 0.32 | 20 | 0 | 2 |
| 2 | 0.60 | 22 | 0 | 0 |
| 3 | 0.95 | 21 | 0 | 0 |

TABLE 2-continued

| Sample Number | Ceramic Layer Thickness [μm] | Average Grain Size [nm] | The Number of Defectives in High Temperature Load Life Test | |
|---|---|---|---|---|
| | | | 6.3 kV/mm | 12.6 kV/mm |
| 4 | 0.85 | 25 | 0 | 0 |
| 5 | 0.98 | 21 | 0 | 0 |
| *6 | 0.94 | 26 | 100 | 100 |
| 7 | 0.61 | 38 | 0 | 5 |
| 8 | 0.98 | 40 | 0 | 0 |
| 9 | 0.75 | 46 | 0 | 0 |
| 10 | 0.62 | 75 | 0 | 0 |
| 11 | 0.51 | 69 | 0 | 0 |
| 12 | 0.75 | 78 | 0 | 0 |
| 13 | 0.80 | 95 | 0 | 3 |
| 14 | 0.82 | 98 | 0 | 0 |
| *15 | 0.68 | 107 | 98 | 100 |
| *16 | 0.81 | 110 | 95 | 100 |
| *17 | 0.75 | 210 | 100 | 100 |
| *18 | 0.85 | 48 | 95 | 100 |
| *19 | 0.65 | 98 | 100 | 100 |
| *20 | 0.98 | 69 | 100 | 100 |
| *21 | 0.55 | 82 | 100 | 100 |
| *22 | 0.32 | 78 | 98 | 100 |
| *23 | 0.67 | 85 | 100 | 100 |
| *24 | 0.92 | 21 | 92 | 100 |
| *25 | 0.97 | 97 | 100 | 100 |

In Tables 1 and 2, samples of sample numbers with * assigned refer to samples outside the scope of the present invention.

(D) Evaluation

Samples 1 to 25 each had a ceramic layer thickness of 1 μm or less.

Samples 1 to 5 and 7 to 14 (within the scope of the present invention) had an average grain size of 20 nm or more and less than 100 nm, and provided favorable reliability. In particular, samples 2 to 5, 8 to 12, and 14 provided so high a reliability that the number of defectives in the high temperature load life test is 0, not only at an electric field strength of 6.3 kV/mm but also at an electric field strength of 12.6 kV/mm. This is presumed to be because the samples 2 to 5, 8 to 12, and 14 contain (Ba, Ca)TiO$_3$ as their main constituent, and thus produce highly insulating crystal grains even in the case of finer crystal grains.

In contrast to these samples, sample 6 had lower reliability. This is presumed to be because the Ca content x greater than 20 mol was less likely to promote dentification on firing, resulting in deterioration in mechanical strength.

Samples 15 to 17 also had lower reliability. This is presumed to be because their average grain sizes were 100 nm or more.

Sample 18 also had lower reliability. This is presumed to be because the Mg content a greater than 20.0 mol caused segregation. Sample 24 also showed lower reliability. This is presumed to be because a R content d greater than 30.0 mol caused segregation.

Sample 19 also had lower reliability. This is assumed to be because the Mg content of less than 0.1 mol failed to suppress grain growth sufficiently. Sample 25 also showed lower reliability. This is assumed to be because the R content d of less than 1.0 mol failed to suppress grain growth sufficiently.

Sample 20 also exhibited lower reliability. This is presumed to be because the Si content b of greater than 20.0 mol caused segregation. Sample 21 also had lower reliability. This is presumed to be because the Si content b of 0.5 mol or less failed to produce a sufficient liquid phase with Ba, resulting in difficulty with densification.

Sample 22 showed lower reliability. This is assumed to be because the Mn content c of greater than 10.0 mol caused electron emission, resulting in a decrease in initial IR. Sample 23 had lower reliability. This is presumed to be because the Mn content c of 0.1 mol or less caused degradation of sinterability, resulting in deterioration in mechanical strength.

Experimental Example 2

In Experimental Example 2, the influences of impurities were evaluated.

In the process of manufacturing a laminated ceramic capacitor, such as in the production of a raw material, there is a possibility that Sr, Zr, Hf, Zn, Na, Ag, Pd, Ni, etc. may be incorporated into the dielectric ceramic as impurities, and may be present in crystal grains and at crystal grain boundaries between the crystal grains. In addition, there is a possibility that the internal electrode constituent may diffuse into crystal grains in the dielectric ceramic, and into crystal grain boundaries between the crystal grains, for example, in a step of firing a laminated ceramic capacitor. Experimental Example 2 is intended to evaluate the influences of these impurities.

(A) Production of Dielectric Ceramic Raw Material

A dielectric ceramic raw material was obtained through the same operation as in the case of Experimental Example 1, except that the impurity components shown in Table 3 were added to a composition represented by the composition formula: $100(Ba_{0.95}Ca_{0.05})TiO_3+2.0\,MgO+1.8SiO_2+1.0\,MnO+8.0DyO_{3/2}$.

TABLE 3

| Sample Number | Impurity Component | |
|---|---|---|
| | Details | Content (part by mol) |
| 101 | 0.4Hf, 0.05Ag | 0.45 |
| 102 | 0.25Sr, 0.02Zn | 0.27 |
| 103 | 0.5Zr, 0.05Ag, 0.1Na | 0.65 |
| 104 | 0.1Zr, 0.07Ni, 0.01Ag | 0.18 |
| 105 | 0.2Na, 0.1Zr | 0.30 |
| 106 | 0.5Ni, 0.02Hf, 0.02Ag | 0.54 |
| 107 | 0.4Pd, 0.01Zn, 0.03Na | 0.44 |
| 108 | 4.0Ni | 4.00 |
| 109 | 1.2Ag, 1.0Ni | 2.20 |
| 110 | 0.1Ni, 1.0Zr | 1.10 |

(B) Production of Laminated Ceramic Capacitor

The dielectric ceramic raw material was used to produce laminated ceramic capacitors according to each sample in the same way as in the case of Experimental Example 1. The dielectric ceramic layers interposed between the internal electrodes had a thickness as shown in the column "Ceramic Layer Thickness" in Table 4.

(C) Structural Analysis and Characterization of Ceramic

The structural analysis and characterization of the ceramic were carried out in the same way as in the case of Experimental Example 1. The results are shown in Table 4.

TABLE 4

| Sample Number | Ceramic Layer Thickness [μm] | Average Grain Size [nm] | The Number of Defectives in High Temperature Load Life Test | |
|---|---|---|---|---|
| | | | 6.3 kV/mm | 12.6 kV/mm |
| 101 | 0.8 | 89 | 0/100 | 0/100 |
| 102 | 0.8 | 85 | 0/100 | 0/100 |
| 103 | 0.8 | 82 | 0/100 | 0/100 |
| 104 | 0.8 | 80 | 0/100 | 0/100 |

TABLE 4-continued

| Sample Number | Ceramic Layer Thickness [μm] | Average Grain Size [nm] | The Number of Defectives in High Temperature Load Life Test | |
|---|---|---|---|---|
| | | | 6.3 kV/mm | 12.6 kV/mm |
| 105 | 0.8 | 84 | 0/100 | 0/100 |
| 106 | 0.8 | 76 | 0/100 | 0/100 |
| 107 | 0.8 | 79 | 0/100 | 0/100 |
| 108 | 0.8 | 91 | 0/100 | 0/100 |
| 109 | 0.8 | 76 | 0/100 | 0/100 |
| 110 | 0.8 | 81 | 0/100 | 0/100 |

(D) Consideration

As can be seen from Table 4, samples 101 to 110 with the impurities incorporated, each with a ceramic layer thickness of 1 μm or less and an average grain size of 20 nm or more and less than 100 nm, provided so high a reliability that the number of defectives in the high temperature load life test is 0 at both electric field strengths of 6.3 kV/mm and 12.6 kV/mm.

What is claimed is:

1. A sintered dielectric ceramic comprising
   as its main constituent, a compound represented by the general formula: $(Ba_{1-x/100}Ca_{x/100})TiO_3$ wherein $0 \leq x \leq 20$, and
   as its accessory constituent, aMg-bSi-cMn-dR, wherein R is at least one member selected from the group consisting of La, Ce, Pr, Nd, Sm, Eu, Gd, Tb, Dy, Ho, Er, Tm, Yb, Lu, and Y, and a, b, c, and d are $0.1 < a \leq 20.0$, $0.5 < b \leq 20.0$, $0.1 < c \leq 10.0$, and $1.0 < d \leq 30.0$ in parts by mol with respect to 100 parts by mol of the main constituent, and
   the sintered ceramic has an average crystal grain size of 20 nm or more and less than 100 nm.

2. The dielectric ceramic according to claim 1 in which $0.2 < a \leq 18.2$, $0.6 < b \leq 7.9$, $0.2 < c \leq 9.7$, and $1.2 < d \leq 29$.

3. The dielectric ceramic according to claim 2 in which R is a single member of said group.

4. The dielectric ceramic according to claim 2 in which R is more than one member of said group.

5. The dielectric ceramic according to claim 1 in which x is greater than 0.

6. A dielectric ceramic comprising
   as its main constituent, a compound represented by the general formula: $(Ba_{1-x/100}Ca_{x/100})TiO_3$ wherein x is 0, and
   as its accessory constituent, aMg-bSi-cMn-dR, wherein R is at least one member selected from the group consisting of La, Ce, Pr, Nd, Sm, Eu, Gd, Tb, Dy, Ho, Er, Tm, Yb, Lu, and Y, and a, b, c, and d where a is at least 15 and $a \leq 20.0$, b is at least 4.9 and $b \leq 20.0$ c is at least 0.2 and $c \leq 10.0$, and d is at least 5.2 and $d \leq 30.0$ in parts by mol with respect to 100 parts by mol of the main constituent, and
   the ceramic when sintered has an average crystal grain size of 20 nm or more and less than 100 nm.

7. The dielectric ceramic according to claim 6 in which R is a single member of said group.

8. The dielectric ceramic according to claim 6 in which R is more than one member of said group.

9. A laminated ceramic capacitor comprising:
   a capacitor main body comprising a plurality of stacked dielectric ceramic layers, and a plurality of internal electrodes disposed at different interfaces between the dielectric ceramic layers; and
   a pair of external electrodes at different positions from each other on an outer surface of the capacitor main body and electrically connected to different internal electrodes,
   wherein each dielectric ceramic layer has a thickness of less than 1 μm and is a sintered body of the dielectric ceramic comprising
   as its main constituent, a compound represented by the general formula: $(Ba_{1-x/100}Ca_{x/100})TiO_3$ wherein 0x20, and
   as its accessory constituent, aMg-bSi-cMn-dR, wherein R is at least one member selected from the group consisting of La, Ce, Pr, Nd, Sm, Eu, Gd, Tb, Dy, Ho, Er, Tm, Yb, Lu, and Y, and a, b, c, and d are $0.1 < a \leq 20.0$, $0.5 < b \leq 20.0$, $0.1 < c \leq 10.0$, and $1.0 < d \leq 30.0$ in parts by mol with respect to 100 parts by mol of the main constituent, and
   the ceramic when sintered has an average crystal grain size of 20 nm or more and less than 100 nm.

10. The laminated ceramic capacitor according to claim 9 in which $0.2 < a \leq 18.2$, $0.6 < b \leq 7.9$, $0.2 < c \leq 9.7$, and $1.2 < d \leq 29$.

11. The laminated ceramic capacitor according to claim 10 in which R is more than one member of said group.

12. The laminated ceramic capacitor according to claim 10 in which R is a single member of said group.

13. The laminated ceramic capacitor according to claim 9 in which x is 0, a is at least 15, b is at least 4.9, c is at least 0.2 and d is at least 5.2.

14. The laminated ceramic capacitor according to claim 13 in which R is a single member of said group.

15. The laminated ceramic capacitor according to claim 13 in which R is more than one member of said group.

16. The laminated ceramic capacitor according to claim 9 in which x is greater than 0.

* * * * *